(12) United States Patent
Amidei et al.

(10) Patent No.: US 9,648,086 B2
(45) Date of Patent: May 9, 2017

(54) SYSTEM, METHOD, AND COMPUTER PROGRAM PRODUCT FOR PROVIDING TEST LOGIC TO USER DEVICES

(71) Applicant: Sonic IP, Inc., Santa Diego, CA (US)

(72) Inventors: William Amidei, La Jolla, CA (US); Jason Braness, San Diego, CA (US); Eric Grab, San Diego, CA (US); Michael Kiefer, Lake Havasu City, AZ (US); Abhishek Shivadas, San Diego, CA (US)

(73) Assignee: Sonic IP, Inc., San Diego, CA (US)

( * ) Notice: Subject to any disclaimer, the term of this patent is extended or adjusted under 35 U.S.C. 154(b) by 740 days.

(21) Appl. No.: 13/930,753

(22) Filed: Jun. 28, 2013

(65) Prior Publication Data

US 2015/0006724 A1    Jan. 1, 2015

(51) Int. Cl.
*H04L 29/08* (2006.01)
*H04N 17/00* (2006.01)

(52) U.S. Cl.
CPC .............. *H04L 67/10* (2013.01); *H04L 67/34* (2013.01); *H04N 17/00* (2013.01)

(58) Field of Classification Search
CPC ....... H04L 67/10; H04L 67/34; H04L 63/272; H04L 63/807; H04L 63/207
USPC ........................................................ 709/225
See application file for complete search history.

(56) References Cited

U.S. PATENT DOCUMENTS

| | | | |
|---|---|---|---|
| 7,043,460 B2 | 5/2006 | Deboer et al. | |
| 7,180,477 B2 | 2/2007 | Howell | |
| 8,239,904 B2 | 8/2012 | Leventu et al. | |
| 8,782,727 B1 | 7/2014 | Nagarajan et al. | |
| 9,332,290 B2 | 5/2016 | Amidei et al. | |
| 2006/0288373 A1* | 12/2006 | Grimes | G06F 3/14 725/62 |
| 2007/0091334 A1 | 4/2007 | Yamaguchi et al. | |
| 2009/0031035 A1 | 1/2009 | Dharmaraju et al. | |
| 2010/0053337 A1* | 3/2010 | Kirk | H04N 17/045 348/181 |
| 2010/0315601 A1 | 12/2010 | Furui | |
| 2011/0138439 A1 | 6/2011 | Toba et al. | |

(Continued)

FOREIGN PATENT DOCUMENTS

| | | |
|---|---|---|
| WO | 2014210542 A2 | 12/2014 |
| WO | 2014210542 A3 | 3/2015 |

OTHER PUBLICATIONS

International Preliminary Report on Patentability for International Application PCT/US2014/044713, Report issued Dec. 29, 2015, Mailed Jan. 7, 2016, 11 Pgs.

(Continued)

*Primary Examiner* — Tu Nguyen
(74) *Attorney, Agent, or Firm* — KPPB LLP

(57) ABSTRACT

Methods and systems for the remote certification testing of user video devices. In an embodiment, test logic and any related test input data is sent from a remote source such as an application server to a user video device. The test logic is executed at the user video device, and test results are output. The test results are sent back to the application server. The operation of the application server may be facilitated by a database. In embodiments, such a database stores test logic and test input data, and/or stores tests results for subsequent analysis.

20 Claims, 10 Drawing Sheets

(56) References Cited

U.S. PATENT DOCUMENTS

| | | |
|---|---|---|
| 2011/0246834 A1 | 10/2011 | Rajashekara et al. |
| 2012/0078566 A1 | 3/2012 | Gintis et al. |
| 2012/0079606 A1 | 3/2012 | Evans et al. |
| 2012/0203891 A1 | 8/2012 | Jiang et al. |
| 2013/0057706 A1 | 3/2013 | Steinberg et al. |
| 2013/0329041 A1 | 12/2013 | Schatzberg et al. |
| 2014/0082655 A1 | 3/2014 | Moon et al. |
| 2015/0035993 A1 | 2/2015 | James et al. |
| 2015/0189344 A1 | 7/2015 | Amidei et al. |

OTHER PUBLICATIONS

International Search Report and Written Opinion for International Application PCT/US2014/044713, report completed Dec. 12, 2014, Mailed Jan. 2, 2015, 14 Pgs.

\* cited by examiner

SYSTEM, METHOD, AND COMPUTER PROGRAM PRODUCT FOR PROVIDING TEST LOGIC TO USER DEVICES

BACKGROUND

Video content may be consumed on different devices in a variety of environments through any of a variety of services. This has freed the video consumer (hereinafter, the user) to enjoy content on whatever user video device they would like, in a wide range of settings. User video devices may include, for example and without limitation, televisions, set-top boxes, digital video recorders and players, desktop computers, laptops, netbooks, tablet computers, smartphones, and wearable computing devices. Video may be consumed by playback of recorded or downloaded content, by streaming, or through other processes. However, the video consumption experience is not always seamless and sometimes sacrifices a consistent high quality experience across the range of devices. This inconsistency may be a result of the device's processing power, the integration of the technology on the device, the age of the firmware of the device, or any of a host of other reasons.

One way to address the quality and consistency issues it through a certification process. A user video device typically includes a variety of technology in the form of hardware, software, and/or firmware. For example, this technology may be delivered by a provider in the form of source code and libraries to a video device manufacturer or component manufacturer, e.g., to any party that provides integrated circuits (ICs), original design manufacturing (ODM), or original equipment manufacturing (OEM), or that integrates such technology into chips or user video devices. After integration is completed, the user video device may be submitted for certification. Here, a user video device is run through a number of tests to verify that the technology is integrated correctly, providing a level of assurance of interoperability across certified devices.

This model is based on a user video device being certified a single time with a specific configuration of hardware, firmware, and/or software, and considering a limited number of use cases for consuming video. However, user video devices are now frequently being upgraded, e.g., Android smartphones getting upgraded operating systems, where a user video device may change significantly after it has been certified. Likewise, there are now digital televisions and DVD players that are regularly receiving new firmware versions. In addition, there are now a large variety of use cases to consider, where different use cases may result in different levels of interoperability and different levels of quality in the user experience. For example, consuming video from local file playback, adaptive streaming, or in a Digital Living Network Alliance (DNLA) setting may all have different results for the user.

BRIEF DESCRIPTION OF THE DRAWINGS/FIGURES

Figure 1:
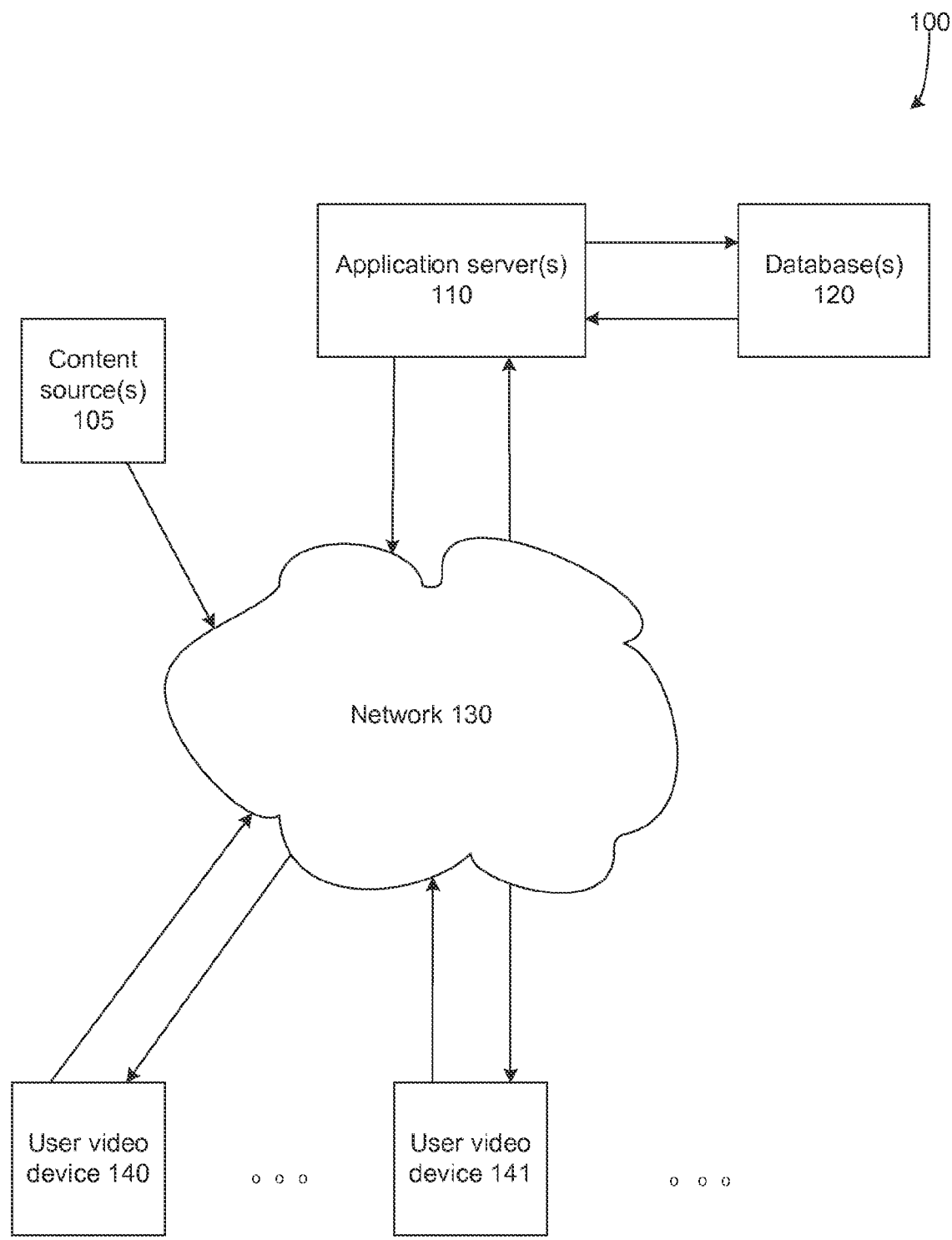
FIG. 1 is a block diagram illustrating components and operation of an embodiment.

In the drawings, the leftmost digit(s) of a reference number identifies the drawing in which the reference number first appears.

DETAILED DESCRIPTION

An embodiment is now described with reference to the figures, where like reference numbers indicate identical or functionally similar elements. While specific configurations and arrangements are discussed, it should be understood that this is done for illustrative purposes only. A person skilled in the relevant art will recognize that other configurations and arrangements can be used without departing from the spirit and scope of the description. It will be apparent to a person skilled in the relevant art that this can also be employed in a variety of other systems and applications other than what is described herein.

Disclosed herein are methods and systems for remote certification testing of user video devices. In an embodiment, test logic and any related test input data are sent from a remote source such as an application server to a user video device. The test logic is executed at the user video device, and test results are output. The test results are sent back to the application server. The operation of the application server may be facilitated by a database. In embodiments, such a database stores test logic and test input data, and/or stores tests results for subsequent analysis. Additional variations and embodiments of such a system and method are described below.

The overall processing of the systems described herein is illustrated in FIG. 1, according to an embodiment. One or more content providers 105 will typically deliver content to user video devices 140, 141, . . . . Content delivery may represent downloading or streaming of content, for example. In the illustrated case, content delivery is shown taking place via a network 130. Certification testing may be performed when one or more remote source(s), such as application server(s) 110, sends test logic to one or more of the user video devices 140, 141, . . . . The application server(s) 110 may be operated by or on behalf of a service provider, component provider, or other party responsible for certification. In an embodiment, the test logic represents the certification test, such that execution of the test logic by a user video device represents the performance of the certification test. The test logic may be accompanied by test input data that serves as input during execution of the test logic. The results of the certification testing can then be returned to the application server 110 via network 130.

In an embodiment, the application server may initially retrieve the test logic and any required test input data from one or more database(s) 120. The test logic and test input data may then be sent to one or more of the user video devices. Test results that result from the certification testing may also be stored in database 120 after having been received at the application server 110. In an alternative embodiment, the test results may be sent by a user video device to database 120 without going through application server 110.

In embodiments, some or all of the communications between the application server 110, database 120, and the user video devices 140, 141, . . . may be protected by some form of information security mechanism(s). Encryption of test logic and test results may be used while this information is in transit. Authentication of these communications may also take place. Any authentication or encryption processing may use symmetric processes (such as the Data Encryption Standard (DES) or Advanced Encryption Standard (AES)) or may use asymmetric methods, e.g., public key mechanisms such as the Rivest Shamir Adleman (RSA) or Diffie Hellman algorithms.

Certification testing can examine a wide range of processes and configurations at a user video device. For example, test logic may verify audio/video synchronization given a specific audio format. In another example, test logic may check the aspect ratio by having the user video device play a video stream showing a square box. The test logic may then take a screen shot and measure the box to assess whether the box is correctly displayed.

The test input data may be specific to a particular certification test. For example, to test whether video is being cropped at a user video device, a certification test may use specific test input data; such test input data may be, for example, a white bounding box. Other certification tests may require a stream containing a number of consecutive bi-predictive frames (B-frames), for example. In another example of certification testing, an HTTP live streaming (HLS) manifest file may be sent to the user video device to test HLS playback.

Application Server

In an embodiment, the application server may first have to ascertain configuration and type information about the user video device to be tested. This is because the particular certification test(s) to be administered may depend, at least in part, on the type and configuration of the user video device. The relevant device attributes can include (but are not limited to) the particular device being tested (e.g., manufacturer and model), the software and/or firmware configuration (e.g., operating system (OS), the OS version, the applications present and their versions), and hardware attributes (e.g., memory capacity and processor speed). Others examples may include the audio and video codecs supported, subtitles supported, media container supported, streaming protocols supported, security and encryption algorithms supported, secure execution environment supported, and the presence of high-bandwidth digital content protection (HDCP) and other output protections.

Figure 2:
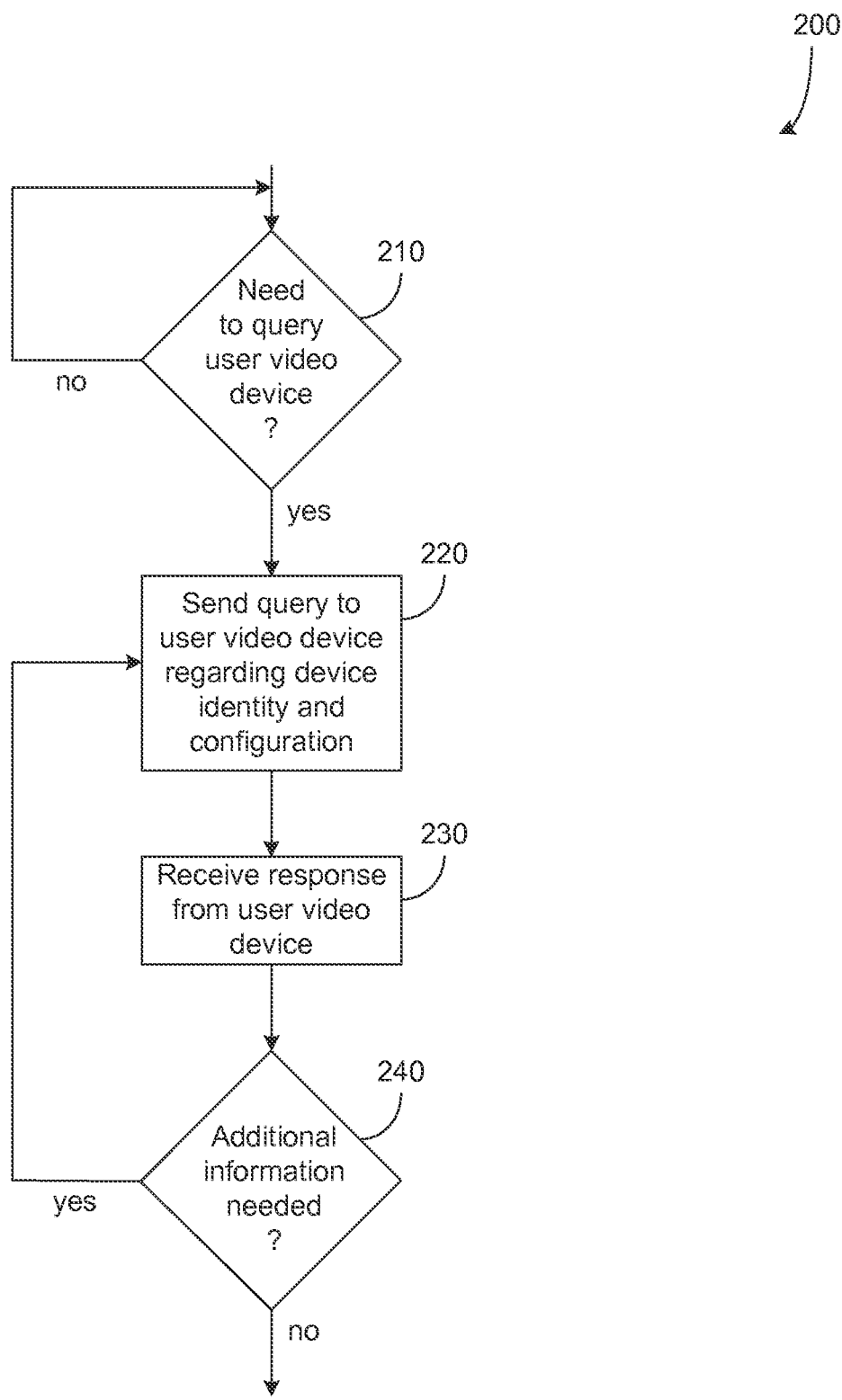
FIG. 2 is a flowchart illustrating a query of the type and configuration of a user video device, according to an embodiment.

A process at the application server for determining information about a user video device is illustrated in FIG. 2, according to an embodiment. At 210, a determination is made as to whether it is necessary to obtain device information. In some situations, the application server may already know the necessary information about the user video device required for determining the necessary certification test(s). If information about the user video device is necessary, then there is a need to query the user video device in the illustrated embodiment, and processing continues at 220. Here, the application server will send a query to the user video device regarding the device identity and/or configuration. At 230, a response is received by the application server, where the response includes at least some of the needed information. At 240 a determination is made as to whether additional information is needed. If so, the process can reiterate at 220, where an additional query may be sent by the application server to the user video device.

While the processing of FIG. 2 may take place prior to the sending of test logic to a user video device, in alternative embodiments this processing may take place as part of test logic execution, so that the test logic operation may include the determination of a device's type or configuration.

Alternatively, the certification testing may proceed first, and the determination of a user video device's type or configuration may take place afterwards. This latter scenario may take place, for example, if the user video device's type or configuration is not important to the selection of particular certification tests, but may be useful for post-testing analysis of test results. Note that in other cases the processing of FIG. 2 may not be necessary. In some circumstances, the application server may have the relevant information about the user video device, as discussed above. In other circumstances, the configuration of a device may not be relevant to the selection of particular certification tests.

Figure 3:
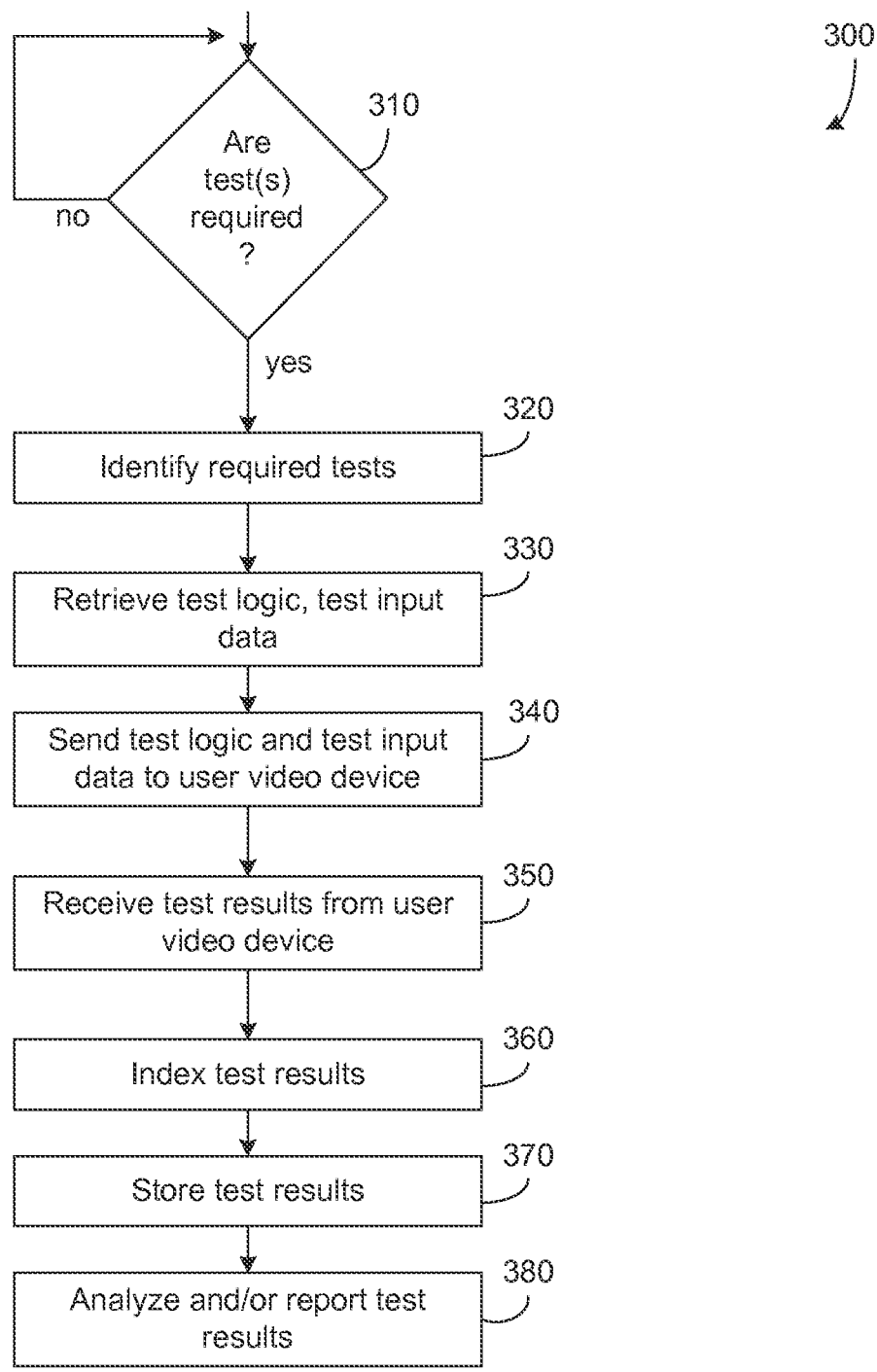
FIG. 3 is a flowchart illustrating processing at a remote source of test logic, according to an embodiment.

Further processing at the application server is illustrated in FIG. 3, according to an embodiment. At 310, a determination is made as to whether certification testing is required for a given user video device. The need for testing may be based on a number of factors. A user video device may have been newly fielded, for example, and there may be questions as to its performance or interoperability. A known configuration change may have taken place or a new service may have been introduced, which would raise interoperability questions. A new version of an operating system or application may have been recently released, for example, which may motivate certification testing of affected video devices. In other situations, where reconfiguration of user video devices is less regular and more unpredictable, certification testing may be performed on a scheduled basis, so that testing is required at certain points in time. In other situations, new information may come to light suggesting that specific configurations of certain user video devices may have interoperability issues. This too may motivate certification testing of affected user video devices. Moreover, the processing of FIG. 2, the querying of a user video device to determine its identity and configuration, may yield information that is relevant in determining whether certification testing is required at 310.

If certification testing is required, then at 320, the required tests are identified by the application server. Certification testing may range from diagnostic testing of functionality to the testing of particular discrete operations. Certification testing may follow a particular logical protocol, and may include initial tests that determine the need for more specific subsequent testing of particular functions.

Once the required certification tests are identified at 320, then at 330 the test logic embodying these tests is retrieved by the application server. As noted above, this test logic may be retrieved from a database in communication with the application server. In the illustrated embodiment, test input data is also retrieved, where this test input data represents data to be used by an identified certification test when the corresponding test logic is executed by the user video device. In an embodiment, the test input data may also be retrieved from the above database, or from a separate location. Moreover, in alternative embodiments, the test logic and/or test input data may be stored in the application server itself, and an external database would not be needed for storage of these items.

The test input data represents information used by the test logic. An example would be a video clip constructed to exercise certain video processing operations. Test input data may alternatively take other forms, such as binary data to exercise a particular routine or circuit.

At 340, the test logic and any test input data are sent to the user video device. After the test logic is executed at the user video device, at 350 the test results are received at the application server from the user video device.

At 360, the test results may be indexed in an embodiment. Here, test results may be annotated or otherwise flagged as being received from a particular user video device type having a particular software, firmware, and/or hardware configuration. At 370, the test results are stored. In an embodiment, the test results are stored in accordance with the indexing discussed above. As noted above, this storage may take place in a database separate from the application server. At 380, analysis and/or reporting of test results takes place. Analysis may be performed by the application server or by another computing device; moreover, the analysis may be performed by human analysts in conjunction with or instead of automated analysis. The analysis process will be discussed further below. In 380, reporting may take place. Reporting may be directed to the user, to the manufacturer of the user video device, to the supplier of components, software, or firmware of the user video device, to industry groups, to consumer groups, and/or to any other interested party. Reporting may include raw test results or include the output of the analysis process, or both.

In general, testing may be directed to a particular user video device, or to a sampling of a population of such devices. The latter would allow statistical analysis of a set of user video devices, for example, in a survey process. Moreover, in other embodiments, a broader testing scenario may be used, such that a given test is divided into discrete portions, where different portions are allocated to different user video devices. This would minimize the burden on any particular user video device. Results of each portion could then be compiled and analyzed.

Figure 4:
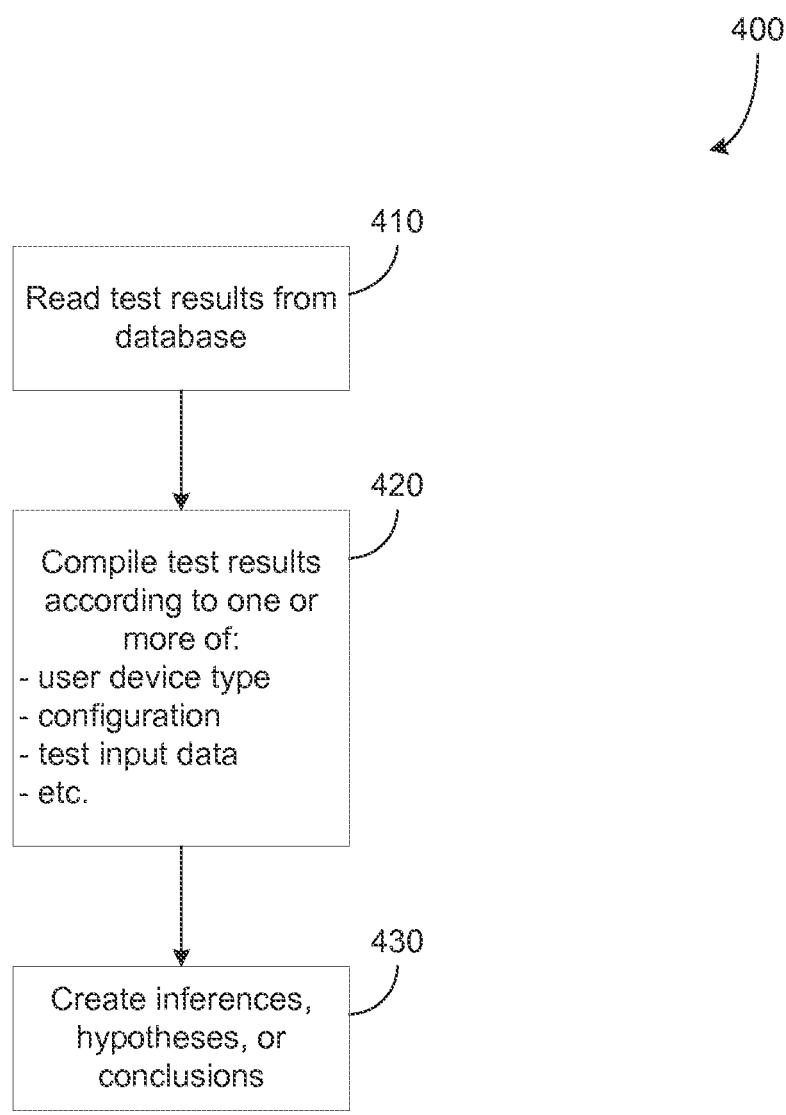
FIG. 4 is a flowchart illustrating analysis of test results, according to an embodiment.

The analysis process is illustrated in FIG. 4, according to an embodiment. At 410, test results are obtained. If the results are stored in a database, the database is accessed to retrieve the test results. At 420, the test results are compiled according to any of a variety of parameters or indices, such as (but not limited to) the device type, the configuration, and/or the test input data. At 430, the test results as organized at 420 may be used to create inferences, hypotheses, or conclusions about the interoperability of the user video device(s) tested. Moreover, analysis may reveal a need for more testing. The processing of FIG. 4 may be performed by the application server, by a different computing platform, or by human analysts, or by some combination thereof.

As would be understood by a person of ordinary skill in the art, analysis can proceed in any of a number of ways to address different questions. For example, test results from different user video devices of a specific model can be aggregated, to examine the performance of that particular model. Analysis may be used to determine the model having the best performance or providing the best experience for a particular service. It may also be useful to track the number of certification tests that fail on a specific model. Certification testing may be used to identify the number of user video devices having a particular version of a software package. Such testing may also be used to determine that a specific type of user video device can run a particular number or type of services. Other analytic goals may also be pursued, as would be understood by a person of ordinary skill in the art.

While the processing of FIGS. 2-4 may be applied to a single user video device, these operations may also be applied to several such devices in aggregate, in order to survey the status of a population of user video devices. This may, for example, allow for the statistical study of the interoperability of similarly configured devices.

The processing illustrated in FIGS. 2-4 may be implemented in hardware, software, firmware, or a combination thereof, including discrete and integrated circuit logic, application specific integrated circuit (ASIC) logic, and microcontrollers, and may be implemented as part of a domain-specific integrated circuit package, or a combination of integrated circuit packages. In an embodiment, this processing may be implemented in an application server, as stated above.

The term software, as used herein, refers to a computer program product including at least one computer readable medium having computer program logic stored therein to cause a computer system to perform one or more features and/or combinations of features disclosed herein. The computer readable medium may be transitory or non-transitory. An example of a transitory computer readable medium may be a digital signal transmitted over a radio frequency or over an electrical conductor, through a local or wide area network, or through a network such as the Internet. An example of a non-transitory computer readable medium may be a compact disk, a flash memory, RAM, ROM, or other data storage device.

Figure 5:
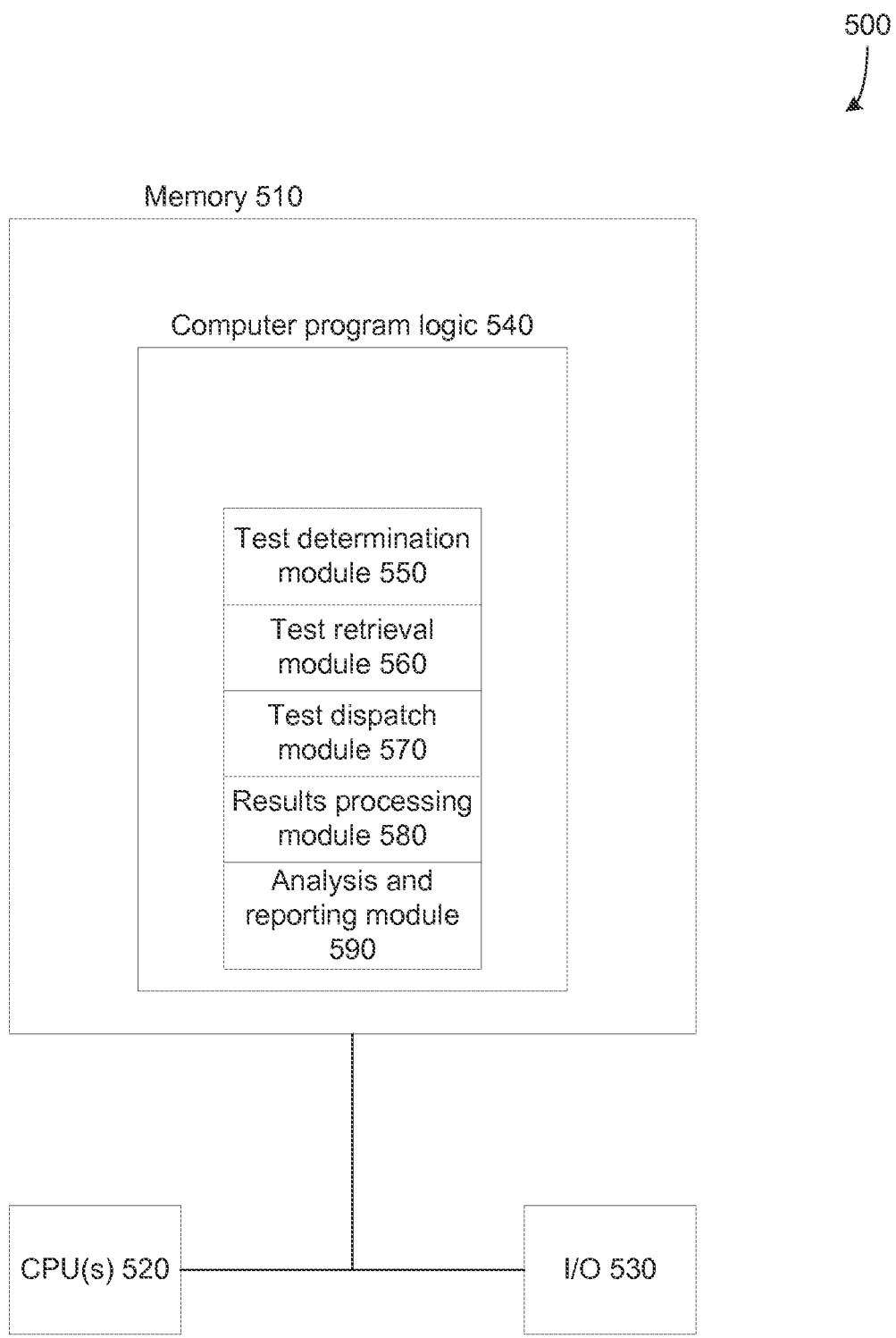
FIG. 5 is a block diagram illustrating software or firmware modules at an application server, according to an embodiment.

A software or firmware embodiment is illustrated in the context of a computing system 500 in FIG. 5. System 500 may represent an application server or a portion thereof. This system includes one or more central processing unit(s) (CPUs) 520 and a body of memory 510 that includes one or more transitory and/or non-transitory computer readable media that store computer program logic 540 and data received or generated during the processing described above. Such data may include but is not limited to test logic, test input data, and test results for example, or configuration and identity information for a user video device. The body of memory 510 may be implemented as one or more devices including a read-only memory (ROM) or random access memory (RAM) device, for example, or a combination thereof. CPU 520 and memory 510 may be in communication using any of several technologies known to one of ordinary skill in the art, such as a bus or a point-to-point interconnect. Computer program logic 540 contained in memory 510 may be read and executed by CPU 520. In an embodiment, one or more I/O ports and/or I/O devices, shown collectively as I/O 530, are connected to CPU 520 and memory 510. In an embodiment, I/O 530 may include connectivity to a network 130 and/or a database 120, shown in FIG. 1.

In the embodiment of FIG. 5, computer program logic 540 may include a module 550 responsible for determination of an appropriate certification test to be sent to a user video device. Test determination module 550 may include the functionality discussed above with respect to FIG. 2 (user video device configuration determination) and 310 and 320 of FIG. 3 (identification of required certification tests). Computer program logic 540 may include a module 560 responsible for retrieval of the appropriate test logic and test input data (330 of FIG. 3) from a database, for example; a module 570 is responsible for the sending of the test logic and test input data to the user video device (340 of FIG. 3) in an embodiment.

Computer program logic 540 may also include a module 550 responsible for the processing of test results. This would include the receipt of test results from a user video device (350 of FIG. 3), the indexing of the test results (360), and the storage of the indexed test results (370). Computer program logic 540 may also include a module 550 responsible for the analysis and reporting of test results (380 of FIG. 3).

User Video Device

Figure 6:
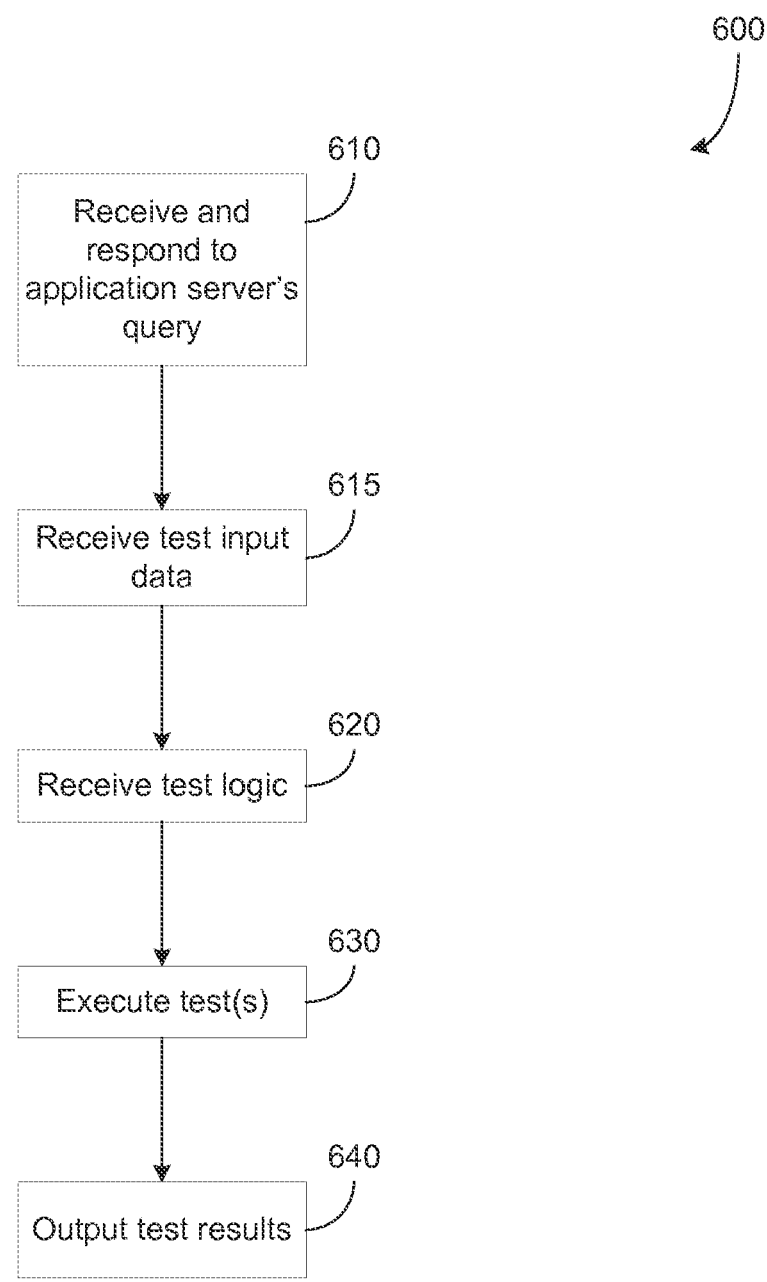
FIG. 6 is a flowchart illustrating processing at a user video device, according to an embodiment.

Processing performed at the user video device is illustrated in FIG. 6, according to an embodiment. At 610, the user video device receives and responds to a query from the application server regarding the identity and/or configuration of the user video device. As discussed above, in some embodiments or in certain situations, such a query and response may not be necessary.

At 615, the user video device receives test input data from the application server. At 620, the user video device receives test logic from the application server. As previously described, in some circumstances test input data may not be needed to execute the test logic. Some tests may not require test input data; in other embodiments, test input data may already be resident at the user video device, so that such data will not be needed from the application server. Moreover, if both the test logic and test input data are received from the application server, they may be received in any order in alternative embodiments.

In an embodiment, the test logic and test input data may be received at the user input device by a certification framework. The certification framework may be internal to the user video device and serves as an interface to the CPU(s), memory, and other video processing logic of the user video device. The certification framework allows execution of the test logic using the test input data and provides access, or "hooks" into the relevant data and processes of the user video device. The certification framework will be discussed further below.

At 630, the user video device executes the received test logic. At 640, test results are output. Test results may be sent to the application server; alternatively, they may be output to the user, to the manufacturer of the user video device, and/or to any other interested party.

In some embodiments or for certain certification tests, user input may be needed during the tests. For example, the test logic may execute and in so doing may present an image or video for the user to evaluate. The user may have to answer questions about what is seen, e.g., provide subjective impressions of an image, or state whether the image or video appears to meet certain criteria. The user's response(s) may then be required for continuation of the certification testing, or the response itself may represent the test results.

Figure 7:
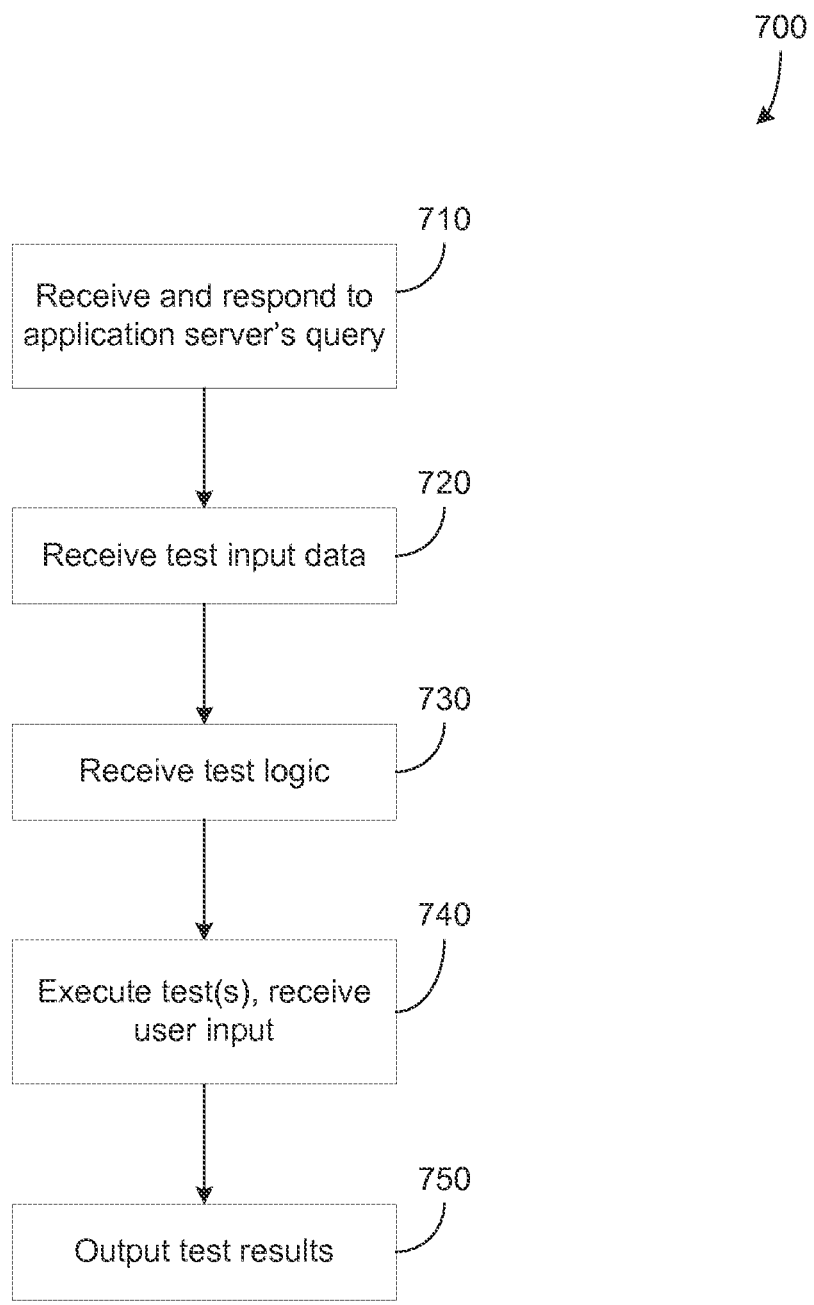
FIG. 7 is a flowchart illustrating processing at a user video device, according to an alternative embodiment.

Such an embodiment is illustrated in FIG. 7. At 710 the user video device receives and responds to a query from the application server regarding the identity and/or configuration of the user video device. As discussed above, in some embodiments or in some situations, the query and response may not be necessary.

At 720, the user video device receives test input data from the application server. At 730, the user video device receives test logic from the application server. As previously described, in some circumstances test input data may not be needed to execute the test logic. Moreover, if both the test logic and test input data are received from the application server, they may be received in any order in alternative embodiments.

At 740, the user video device executes the received test logic. As part of the certification test, the user may be prompted for input, so that the user video device then receives the user input. Note that in situations where user input is required, the certification testing may be repeated for a number of users of the particular user video device or feature. This would allow development of some statistical confidence in particular test results, given the human input into the certification test, or raise additional questions to be investigated. At 750, test results are output. As in the process of FIG. 6, the test results may be sent to the application server; alternatively, they may be output to the user, to the manufacturer of the user video device, and/or to any other interested party.

In different embodiments, the actual execution of test logic (630 and 740 above) may be triggered by a command from the application server, or may be triggered by events or conditions at the user video device. For example, certain operations in the user video device, or a particular context may trigger execution of the test logic. In alternative embodiments, execution of the test logic may be at the discretion of the user (or of a test technician acting as a user in a certification test lab), or may be executed as processing bandwidth becomes available at the user video device.

In an alternative embodiment, an incentive may be provided to the user, to encourage participation in certification testing. For example, test input data may be incorporated into a video, such as a movie or music video. If the user consents to allow certification testing of his user video device, he will be allowed access to the video, as a streaming video or as a download for example. In this way, the certification testing can be performed using the provided video as test input and the test results sent to the application server. In exchange for consenting to the certification testing, the user is given access to the video. In an embodiment, subsequent viewings of the video at the user video device represent subsequent opportunities for further certification testing.

Figure 8:
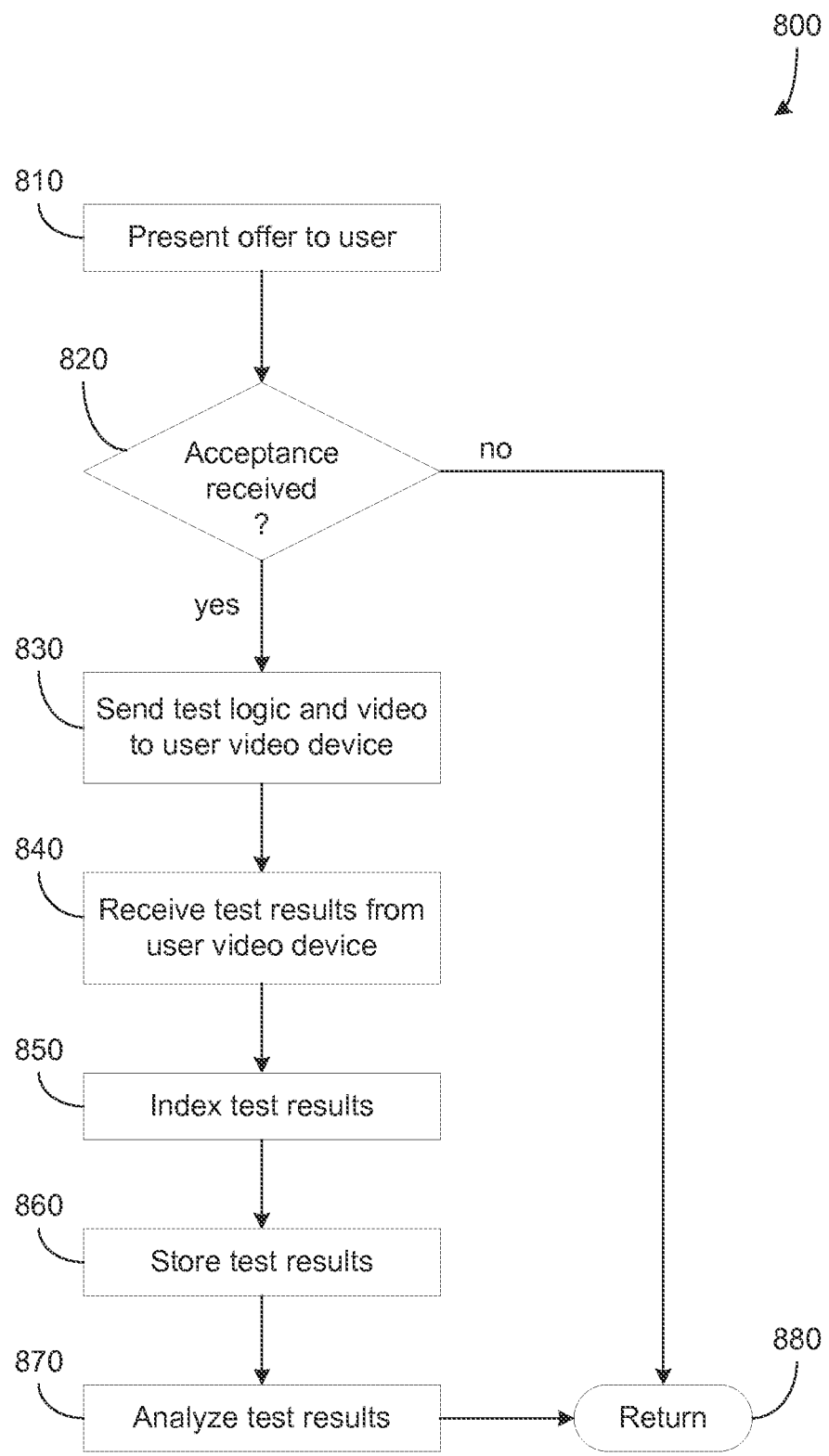
FIG. 8 is a flowchart illustrating an incentivized approach to obtaining user consent to certification testing, according to an embodiment.

This process is illustrated in FIG. 8, according to an embodiment. At 810, an offer is presented to the user. The offer may be presented by the party responsible for certification, for example. The offer includes access to a video, in exchange for the user's cooperation in certification testing. The offer may be made through any of several means, such as email, SMS messaging, a social network communication, or any other mechanism known to persons of ordinary skill in the art. The user may convey acceptance to the party responsible for certification through any of the means just mentioned. In an embodiment, an acceptance may be received at the application server. At 820, a determination is made as to whether an acceptance has been received. If so, then at 830 test logic and the video are sent to the user video device from the application server and certification testing may proceed as described above. In particular, at 840 test results are sent to the application server. At 850, the test results may be indexed and at 860 the indexed test results may be stored at a database. At 870, the test results may undergo analysis as discussed above. In an embodiment, the test dispatch module at the application server (see ref. 570, FIG. 5) is responsible for providing the video to the user video device.

Figure 9:
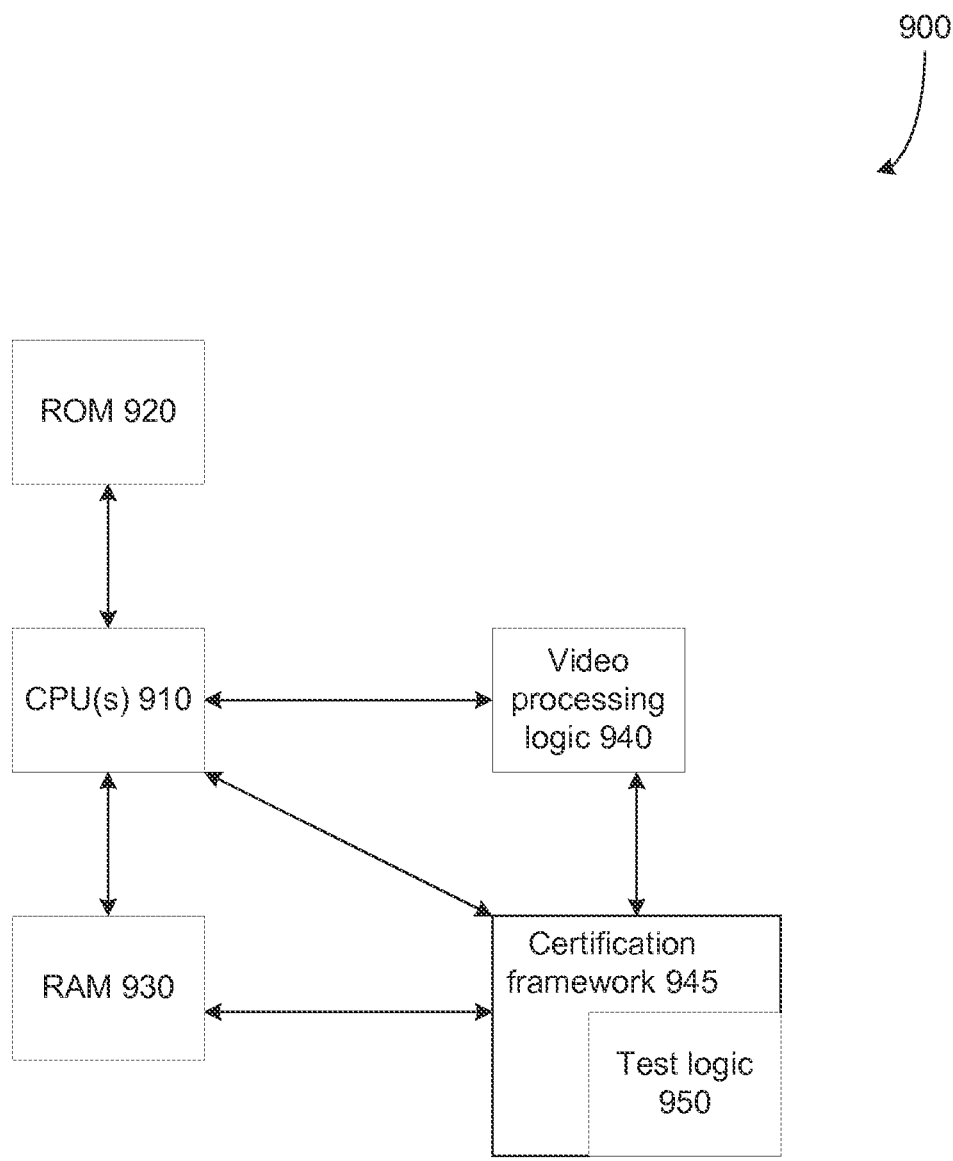
FIG. 9 is a block diagram illustrating functional components at a user video device, according to an embodiment.

The test logic may operate in any of several ways in different embodiments. Structurally, a user video device may have one or more central processor units 910 as shown in FIG. 9, each with one or more read-only memory (ROM) devices 920 and one or more random access memory (RAM) devices 930. Video processing at the user video processor unit may be performed by the CPU(s) 910 and/or video processing logic 940. Video processing logic 940 may include one or more programmable processors or co-processors (such as a graphics processing unit) with associated memory, software or firmware, and/or dedicated video processing circuitry.

Test logic, once received from the application server and installed at the user video device, is shown as module 950. Test logic 950 may be embodied as software that is stored in a memory device. Though shown as a separate module, in an embodiment, this logic may be stored in RAM 930 or in memory associated with video processing logic 940. Test logic 940 may run on CPU 910 and/or on another processor in video processing logic 940. As test logic 940 executes, it may read data that results from its operations. For example, this data may be found in RAM 930, in video processing logic 940, and/or in CPU 910.

As noted above, in an embodiment, the test logic 950 and test input data may be received at the user input device by certification framework 945. The certification framework is internal to the user video device and serves as an interface between test logic 950 and the CPU(s) 910, memory 930, and/or other video processing logic 940 of the user video device. The certification framework allows execution of the test logic 950 using the test input data and provides access, or "hooks" into the relevant data and processes of the user video device. This would allow tapping into data structures in RAM or access to CPU register values for example, or allow monitoring of CPU or graphics processing unit (GPU) performance. In an embodiment, the available hooks and/or other features in the certification framework 945 may be reported to the application server prior to the server's identification of the particular certification tests to be run (ref 320, FIG. 3). For example, these features may be specified to the application server during the query of the user video device shown in FIG. 2.

Certification framework 945 may be implemented as software, firmware, hardware, or a combination thereof. The certification framework 945 may be installed in the user video device at manufacture or installed subsequently. Alternatively, a software embodiment of certification framework 945 or software portions thereof may be delivered to the user video device via download.

The processing illustrated in FIGS. 6-8 may be implemented in the user video device in hardware, software, firmware, or any combination thereof, including discrete and integrated circuit logic, ASIC logic, and microcontrollers, and may be implemented as part of a domain-specific integrated circuit package, or a combination of integrated circuit packages.

Figure 10:
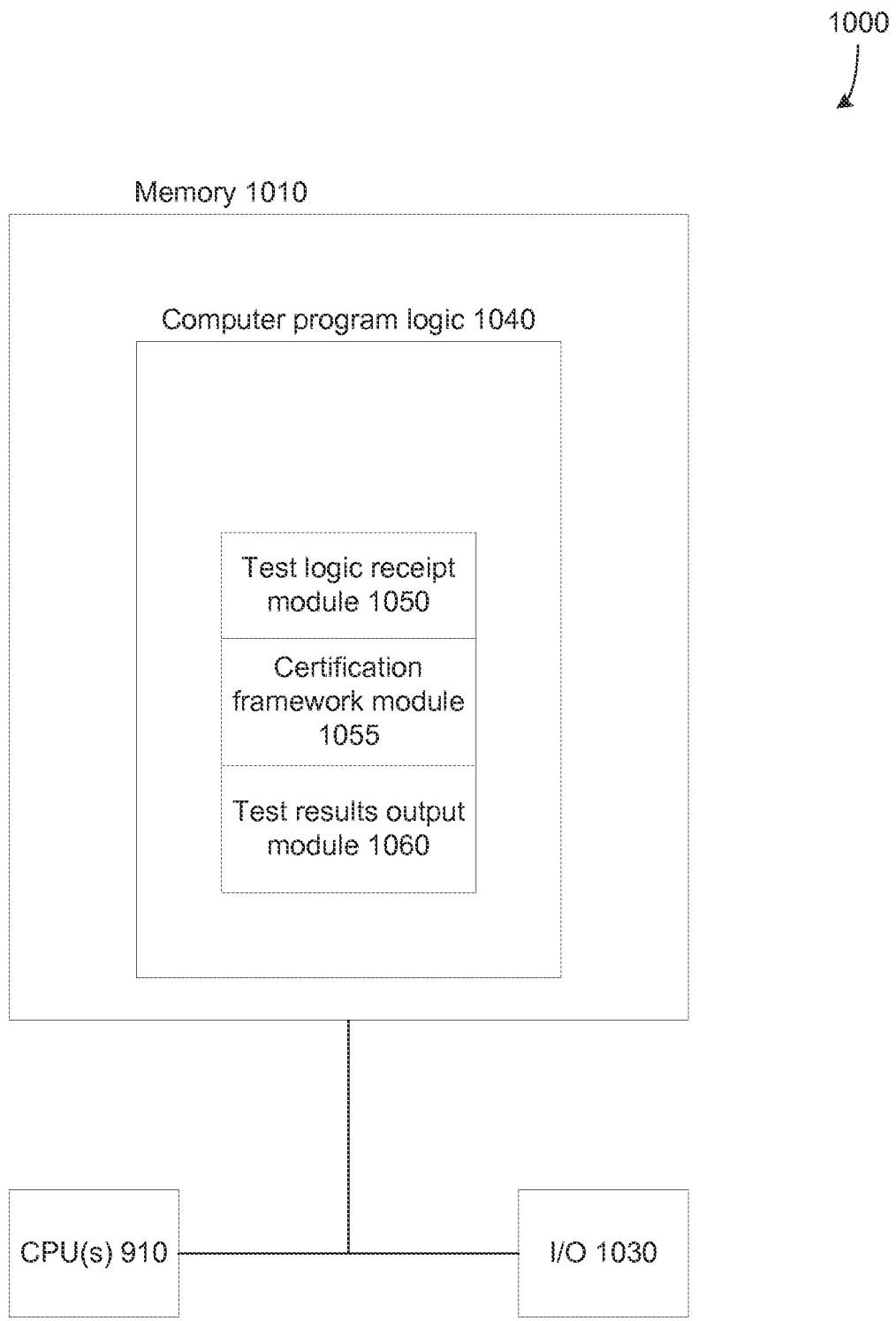
FIG. 10 is a block diagram illustrating software or firmware modules at a user, according to an embodiment.

A software or firmware embodiment is illustrated in the context of a computing system in FIG. 10, which may be incorporated in a user video device. System 1000 of FIG. 10 corresponds to system 900 of FIG. 9, but is redrawn here to show modules of a software/firmware implementation of FIGS. 6-8. This system includes one or more CPU(s) 910, plus memory 1010 that includes one or more transitory and/or non-transitory computer readable media storing computer program logic 1040 and data received or generated during the processing described above. Such data may include but is not limited to test logic, test input data, and test results for example. In an embodiment, memory 1010 may collectively represent RAM 930 and ROM 920 of FIG. 9. CPU(s) 910 and memory 1010 may be in communication using any of several technologies known to one of ordinary skill in the art, such as a bus or a point-to-point interconnect. Computer program logic 1040 contained in memory 1010 may be read and executed by CPU(s) 910. In an alternative embodiment, logic 1040 may be executed by a different processor. In an embodiment, one or more I/O ports and/or I/O devices, shown collectively as I/O 1030, are connected to CPU(s) 910 and memory 1010. In an embodiment, I/O 1030 may include connectivity to a network 130, shown in FIG. 1.

In the embodiment of FIG. 10, computer program logic 1040 may include a module 1050 responsible for receipt of test logic from the application server. Test logic receipt module 1050 may include the functionality illustrated at 620 and 730 discussed above. Computer program logic 1040 may also include a certification framework module 1055 responsible for the functionality of the certification framework 945. In an embodiment, this may include the interfacing between the test logic 950 and other memory locations and processors in the user video device. Computer program logic 1040 may also include a module 1060 responsible for output of test results. Test results output module 1060 incorporates the functionality discussed above with respect to 640 and 750, according to an embodiment. In an alternative embodiment, the certification framework module 1055 may incorporate the functionality of modules 1050 and/or 1060.

Note that in some embodiments, information about one or more user video devices may be obtained for certification purposes without the delivery of specific test logic or test input data. Here, testing may be a matter of collecting data that is generated by normal operation of the user video devices. For example, data in a user video device may be mined, e.g., CPU-related underflow that occurs under certain circumstances. Such information may be sent periodically (or aperiodically) to the application server for subsequent analysis. While the logic for such data collection and reporting may be sent to the user video device in the manner of test logic as described above, such logic may alternatively be installed at manufacture or installed subsequently.

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the exemplary embodiments disclosed herein.

What is claimed is:

1. A method of incentivizing certification testing of video devices, the method performed by an application server, the method comprising:

causing, through a network communication, a video device to present an offer of access to a video in exchange for a user's consent to allow certification testing of the video device using an application server, wherein certification test input data is incorporated into the video;

when an acceptance of the presented offer is received at the application server:

sending certification test logic to the video device, wherein the certification test logic evaluates content playback on the video device based on the certification test input data;

allowing access to the video on the video device, wherein the video device uses the certification test logic to generate certification test results based on the playback of the video; and receiving the generated certification test results at the application server.

2. The method of claim 1, wherein access to the video comprises access to a streamed version of the video.

3. The method of claim 1, wherein access to the video comprises permission to download the video.

4. The method of claim 1, wherein subsequent playback of the video at the video device causes the playback device to generate additional certification test results, and wherein the method further comprises receiving the additional certification test results generated from the subsequent playback of the video at the application server.

5. The method of claim 1, wherein the offer is presented by a party responsible for certification testing.

6. The method of claim 1, further comprising:

indexing the certification test results from the video device and annotating receipt of the certification test results as being from the video device.

7. A system for incentivizing certification testing of video devices, comprising:

a processor; and a non-transitory memory in communication with the processor, the non-transitory memory for storing a plurality of processing instructions for directing the processor to:

cause, through a network communication, a video device to present an offer of access to a video in exchange for a user's consent to allow certification testing of the video device, wherein certification test input data is incorporated into the video, when an acceptance of the presented offer is received:

send certification test logic to the video device, wherein the certification test logic evaluates content playback on the video device based on the certification test input data;

allow access to the video on the video device, wherein the video device uses the certification test logic to generate certification test results based on the playback of the video; and receive the generated certification test results.

8. The system of claim 7, wherein access to the video comprises access to a streamed version of the video.

9. The system of claim 7, wherein access to the video comprises permission to download the video.

10. The system of claim 7, wherein the processor and the memory are incorporated in an application server.

11. The system of claim 7, wherein subsequent playback of the video at the video device causes the playback device to generate additional certification test results, and wherein the plurality of processing instructions further direct the processor to receive the additional certification test results generated from the subsequent playback of the video.

12. The system of claim 7, wherein the offer is presented by a party responsible for certification testing.

13. The system of claim 7, wherein the plurality of processing instructions further direct the processor to:

index the certification test results from the video device and annotate receipt of the certification test results as being from the video device.

14. A computer program product comprising a non-transitory computer useable medium having control logic stored therein, the computer control logic comprising instructions for causing a processor to:

cause, through a network communication, a video device to present an offer of access to a video in exchange for a user's consent to allow certification testing of the video device, wherein certification test input data is incorporated into the video, when an acceptance of the presented offer is received send certification test logic to the video device, wherein the certification test logic evaluates content playback on the video device based on the certification test input data;

allow access to the video on the video device, wherein the video device uses the certification test logic to generate certification test results based on the playback of the video; and receive the generated certification test results.

15. The computer program product of claim 14, wherein access to the video comprises access to a streamed version of the video.

16. The computer program product of claim 14, wherein access to the video comprises permission to download the video.

17. The computer program product of claim 14, wherein the processor and the computer useable medium are incorporated in an application server.

18. The computer program product of claim 14, wherein subsequent playback of the video at the video device causes the playback device to generate additional certification test results, and wherein the plurality of processing instructions further direct the processor to receive the additional certification test results generated from the subsequent playback of the video.

19. The computer program product of claim 14, wherein the offer is presented by a party responsible for certification testing.

20. The computer program product of claim 14, wherein the plurality of processing instructions further cause the processor to:

index the certification test results from the video device and annotate receipt of the certification test results as being from the video device.

* * * * *